Jan. 4, 1966 P. E. MASSIE 3,227,465
STAIR-CLIMBING WHEEL CHAIR
Filed Dec. 28, 1962 10 Sheets-Sheet 1
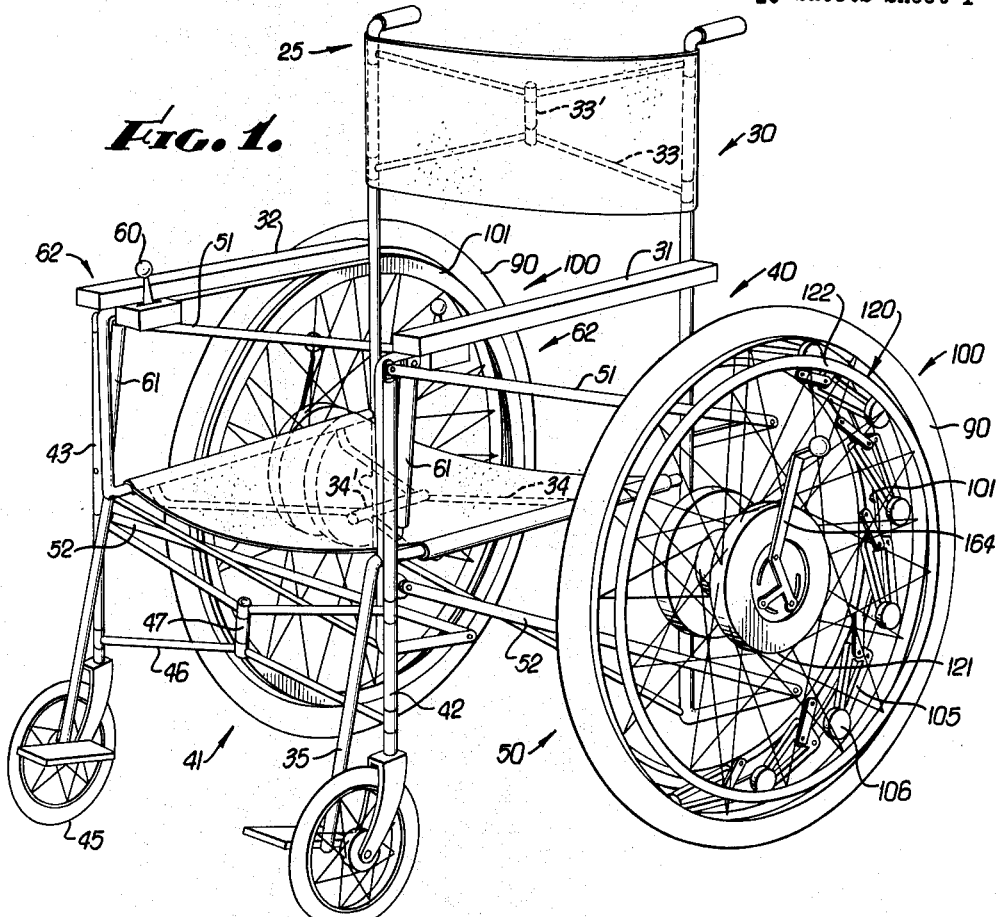
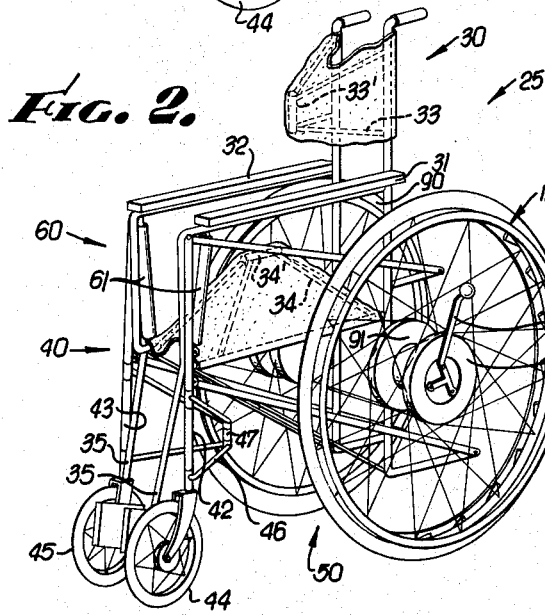
INVENTOR.
PHILIP E. MASSIE
BY
Albert M. Herzig
ATTORNEY

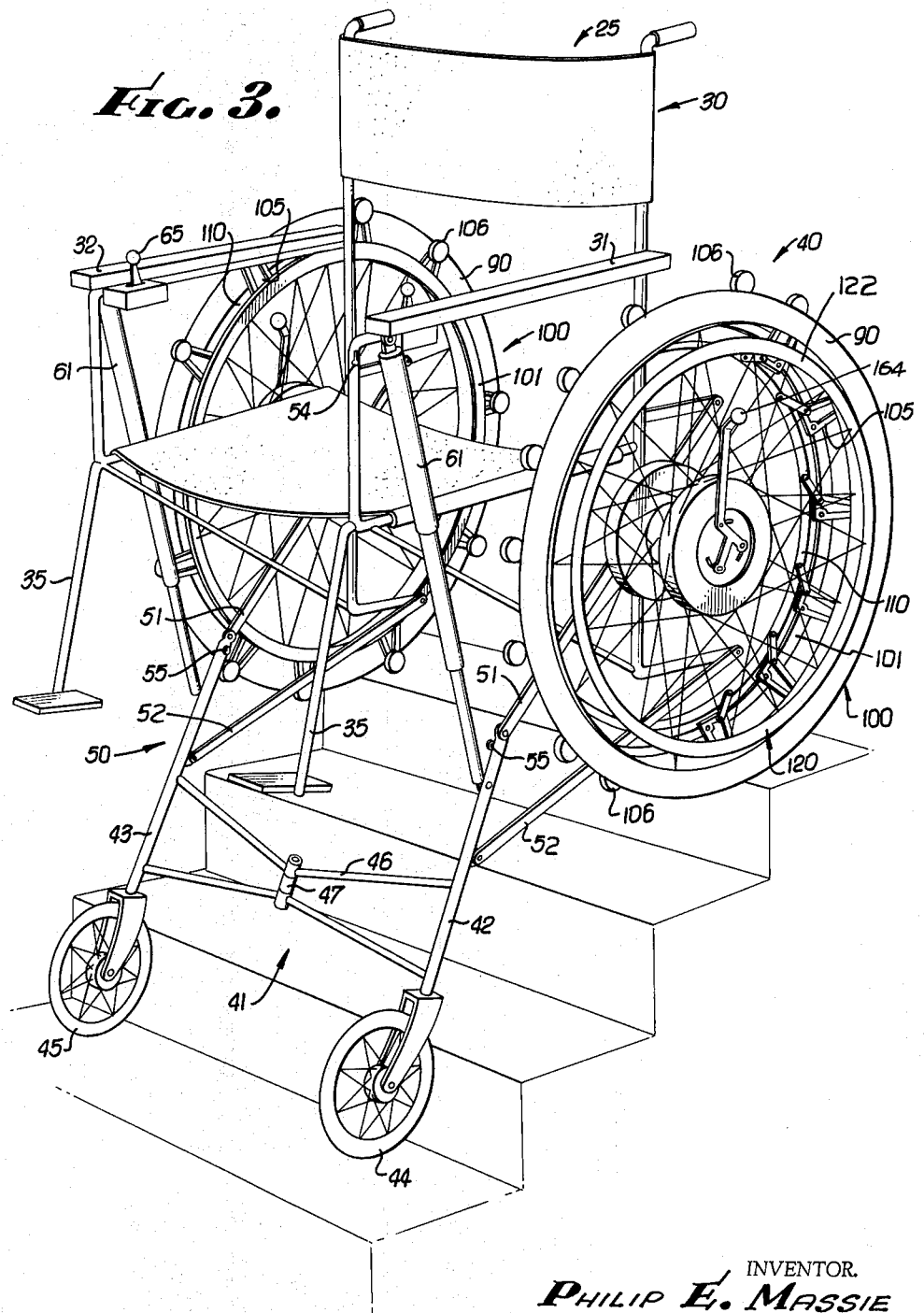

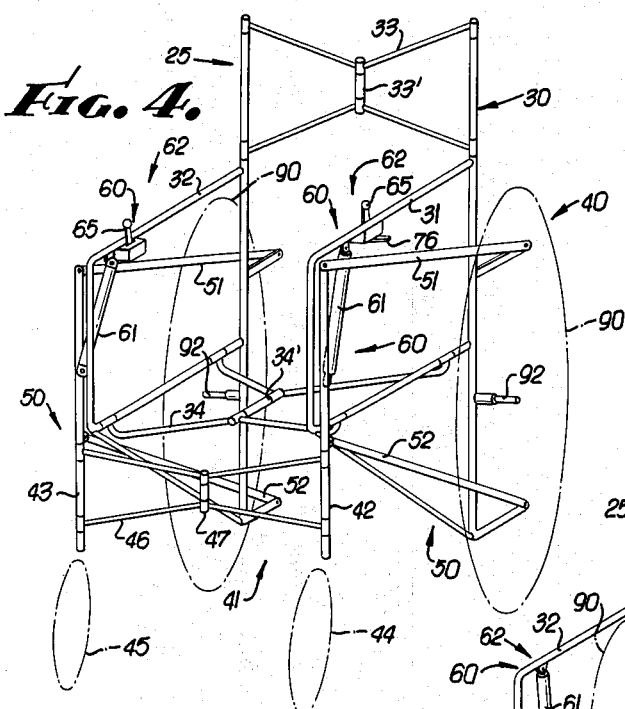

Jan. 4, 1966     P. E. MASSIE     3,227,465
STAIR-CLIMBING WHEEL CHAIR
Filed Dec. 28, 1962     10 Sheets-Sheet 4
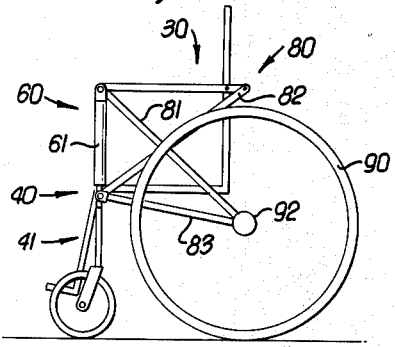
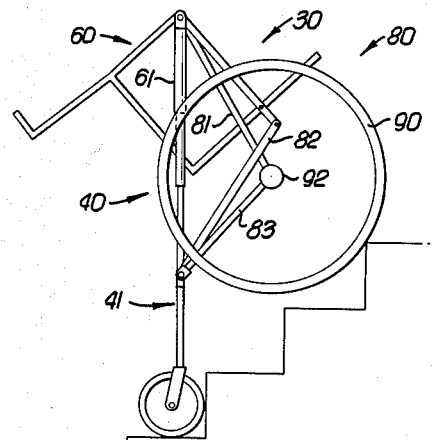
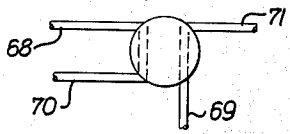
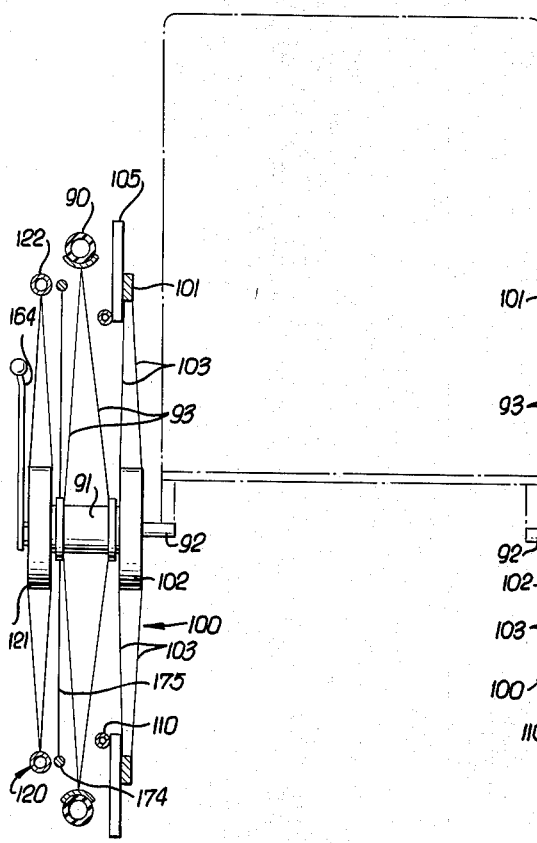
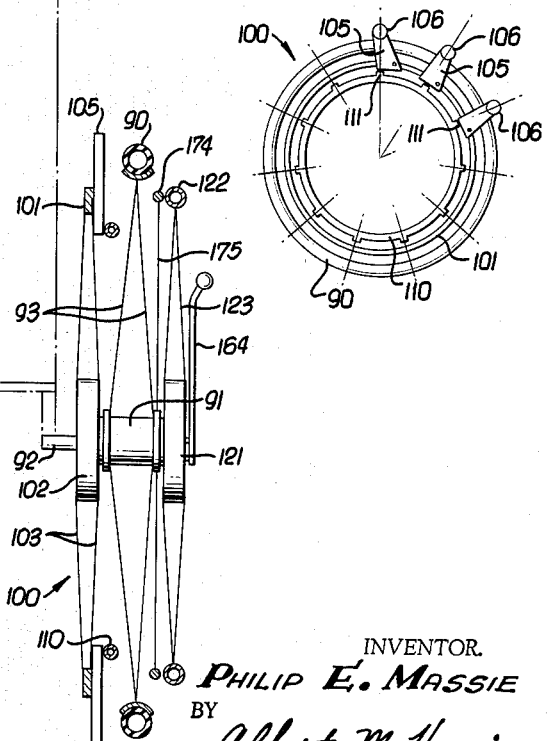
INVENTOR.
PHILIP E. MASSIE
BY Albert M. Herzig
ATTORNEY.

Jan. 4, 1966

P. E. MASSIE 3,227,465

STAIR-CLIMBING WHEEL CHAIR

Filed Dec. 28, 1962

INVENTOR.
PHILIP E. MASSIE
BY
Albert M. Herzig
ATTORNEY.

Jan. 4, 1966 P. E. MASSIE 3,227,465
STAIR-CLIMBING WHEEL CHAIR
Filed Dec. 28, 1962 10 Sheets-Sheet 6
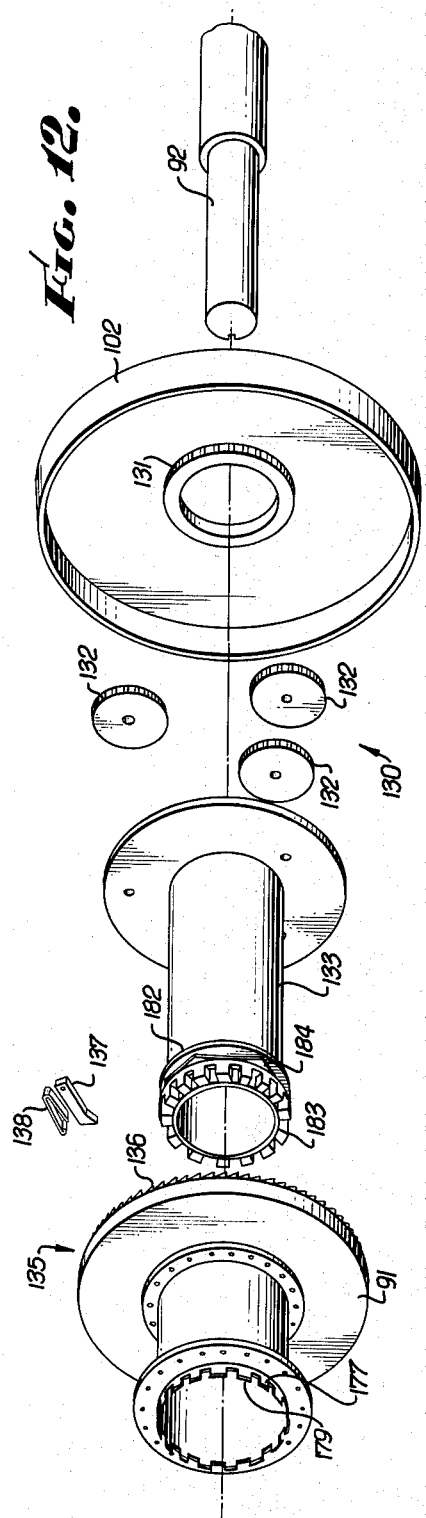
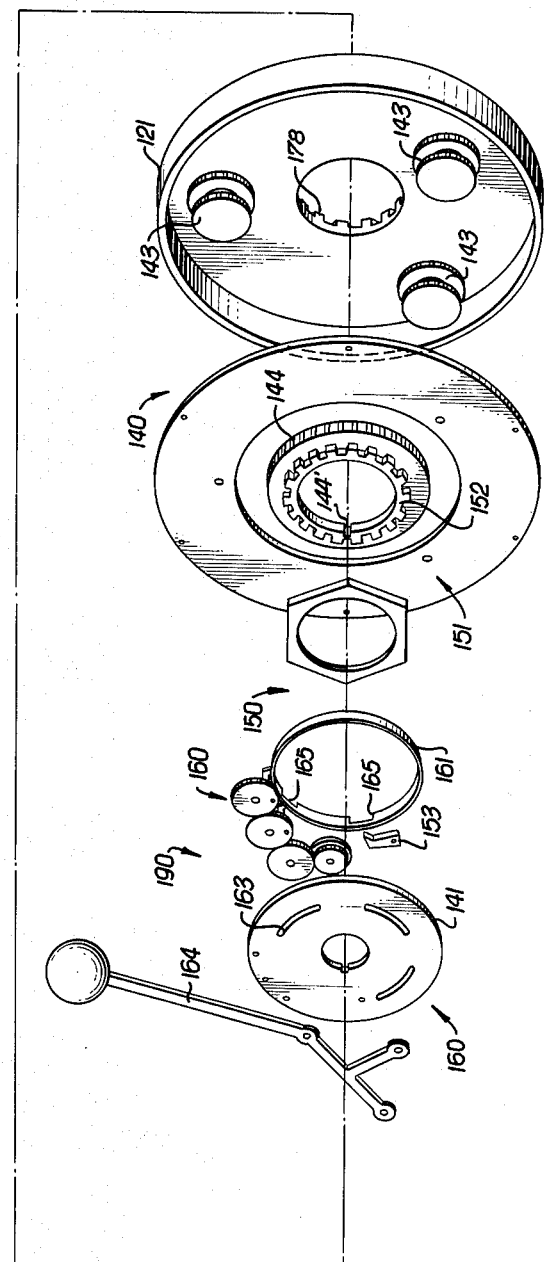
FIG. 12.
INVENTOR.
PHILIP E. MASSIE
BY
Albert M. Herzig
ATTORNEY.

INVENTOR.
PHILIP E. MASSIE
BY
Albert M. Herzig
ATTORNEY.

Jan. 4, 1966  P. E. MASSIE  3,227,465
STAIR-CLIMBING WHEEL CHAIR
Filed Dec. 28, 1962  10 Sheets-Sheet 8

INVENTOR.
PHILIP E. MASSIE
BY Albert M. Herzig
ATTORNEY.

Jan. 4, 1966  P. E. MASSIE  3,227,465
STAIR-CLIMBING WHEEL CHAIR
Filed Dec. 28, 1962  10 Sheets-Sheet 9
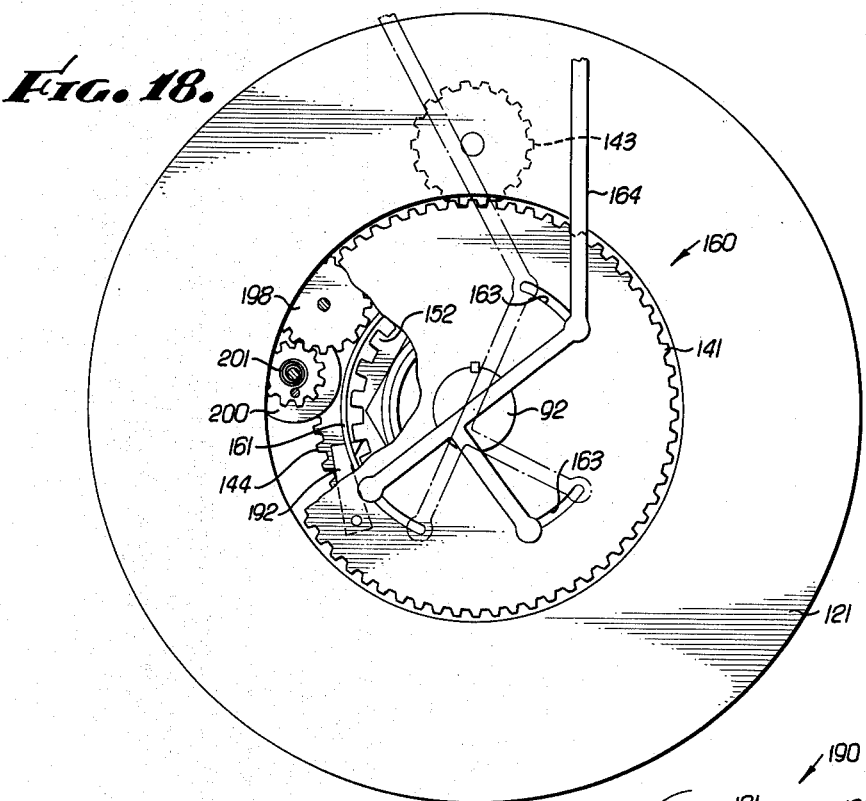
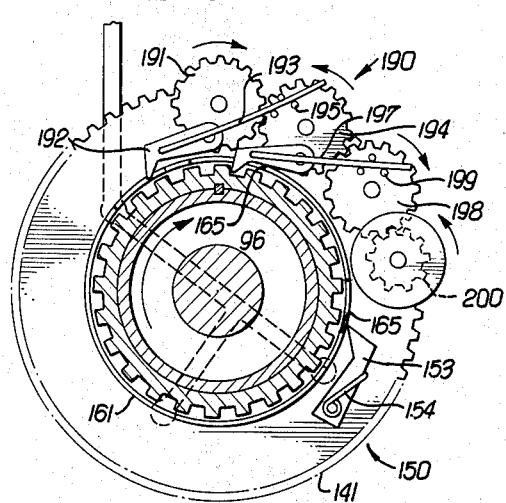
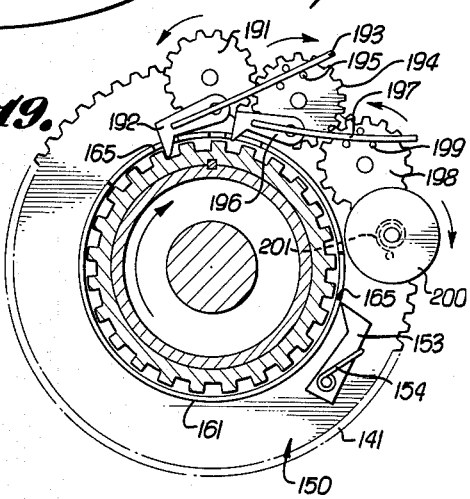
INVENTOR.
PHILIP E. MASSIE
BY Albert M. Herzig
ATTORNEY.

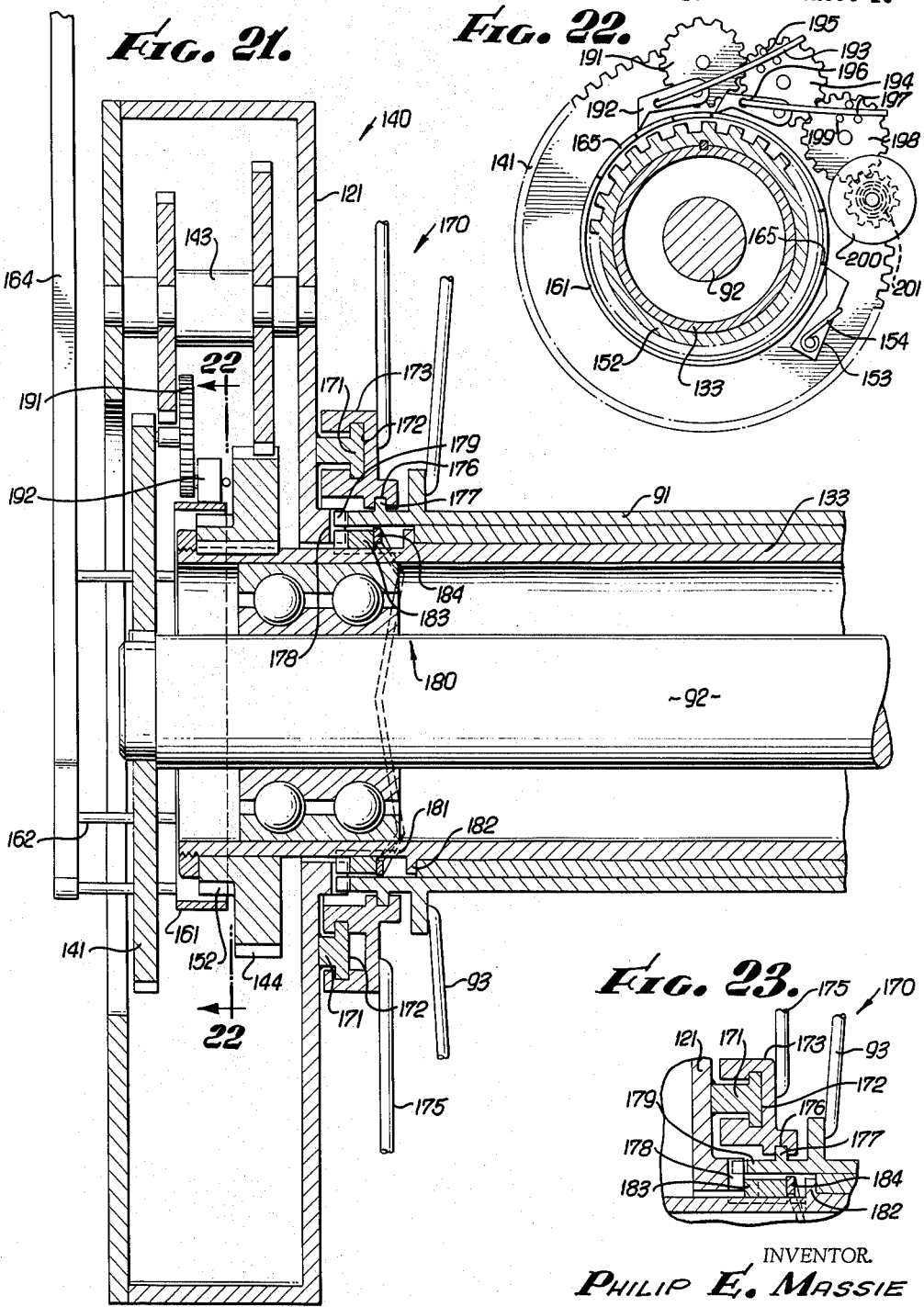

United States Patent Office 3,227,465
Patented Jan. 4, 1966

3,227,465
STAIR-CLIMBING WHEEL CHAIR
Philip E. Massie, 4220 Irving Place, Culver City, Calif.
Filed Dec. 28, 1962, Ser. No. 248,104
21 Claims. (Cl. 280—5.2)

In general, the present invention relates to a stair-climbing wheel chair. More particularly, the present invention relates to an inexpensive, occupant-driven foldable stair-climbing wheel chair which is adapted to safely climb stairs and to turn on the stair landings.

The problems involved in the design of a stair-climbing wheel chair have been succinctly set forth in the pamphlet entitled Wanted—a Stair-Climbing Wheel Chair put out by the U.S. Department of Commerce, National Inventors Council in January 1962. As stated therein on page 3:

"In considering the design of a stair-climbing wheel chair, it is most important that the overall objective be clearly understood. The objective is to give an active handicapped individual an additional range of mobility. The desired item should enable him to cope with the usual problems which he might encounter in going to or coming from work, moving about industrial buildings and the like. It must be borne in mind that the chair will perform the usual wheel chair function approximately 95% of the time; therefore, not too much of the conventional wheel chair's versatility and convenience should be sacrificed in providing the climbing function. In this connection it might be well to point out that many active handicapped are able to fold a conventional wheel chair, put it in their automobile and drive to work. If this cannot be accomplished with a climbing chair, the overall objective of providing the handicapped with independent mobility will not be achieved."

From the foregoing statement it is clear that the main problem in achieving a stair-climbing wheel chair is not so much the design of a chair that will climb stairs but, rather, a wheel chair that will not only climb stairs but that will also remain *foldable* and well adapted to traverse smooth horizontal surfaces ninety-five percent of the time. For this reason, the aforementioned booklet after specifying that the chair should be designed to support an occupant of at least 200 pounds and should weigh not more than 50–75 pounds at the most, next specified that the chair must be collapsible. Other important criteria set forth by the aforementioned booklet are: (a) The width of the chair should be a maximum of 25 inches; (b) the turning radius of the chair should be a bare minimum so that it has the ability to negotiate an L-type stair landing as small as 3 feet by 3 feet; (c) the chair should be able to negotiate street curbings and any stairs with average height risers and depth of tread as found in office buildings and halls; (d) any transition or adjustments required between normal and ascending and descending functions must be accomplished in a minimum time to eliminate delays at street curbings and stairways; (e) preferably, the wheel chair should be occupant-driven so that a minimum arm strength of 10 pounds may be used in driving the wheel chair; (f) the chair must be "fail-safe" to prevent uncontrolled descent in the event something happens to the occupant or mechanisms; and (g) cost should be kept at a minimum so that the retail cost should not be more than $500. In addition to these criteria, another important consideration is that the stair-climbing wheel chair should involve the minimum amount of change in the present conventional folding wheel chair so that present manufacturing facilities can be utilized with the fewest changeover problems and, perhaps, the present conventional folding wheel chairs can be converted to become stair-climbing.

In general, therefore, an object of the present invention is a stair-climbing wheel chair.

Another object of the present invention is an inexpensive, occupant-driven, foldable stair-climbing wheel chair.

Still another object of the present invention is a stair-climbing wheel chair having a minimum turning radius in an area as small as 3 feet by 3 feet.

Still another object of the present invention is a stair-climbing wheel chair were adjustments between the normal and ascending and descending functions may be accomplished in a minimum amount of time.

Still another object of the present invention is a stair-climbing wheel chair wherein the chair is "fail-safe" by having three separate and independent mechanisms to prevent uncontrolled descent in the event something happens to the occupant or one or more of the mechanisms.

Still another object of the present invention is a stair-climbing wheel chair which involves the minimum amount of change in construction and appearance from the present conventional folding wheel chair so that present manufacturing facilities can easily be utilized.

Still another object of the present invention is an attitude control means for regulating the angle of a chair with respect to the surface supporting said chair.

Still another object of the present invention is a retractable stair traction means adapted to be mounted on a wheel for engaging the steps of stairs.

Still another object of the present invention is a combination of a transmission gear and a differential gear adapted to be located within a wheel hub.

Still another object of the present invention is a governor means for controlling the rate of rotation of a wheel.

Other objects and advantages of the present invention will be readily apparent from the following description and drawings which illustrate a preferred exemplary embodiment of the present invention.

In general, the present invention involves an inexpensive, occupant-driven, foldable, stair-climbing wheel chair adapted to safely climb stairs and to turn on stair landings. The wheel chair comprises essentially: (a) A foldable central chair means for seating an occupant; (b) an attitude control means for regulating the angle of said chair means with respect to the surface supporting the wheel chair; (c) a drive wheel mounted on each side of the chair means on a drive wheel hub for supporting the rear end of said wheel chair with said drive wheel hub being rotatably mounted on an axle attached to said chair means; and (d) retractable stair traction means rotatably mounted on each side of said chair means for engaging the steps of the stairs.

In order to facilitate understanding of the present invention, reference will now be made to the appended drawings of a preferred specific embodiment of the present invention. Such drawings should not be construed as limiting the invention which is properly set forth in the appended claims.

In the drawings:

FIG. 1 is a perspective view of the stair-climbing wheel chair of the present invention in an unfolded position on a horizontal surface.

FIG. 2 is a perspective view of the stair-climbing wheel chair of the present invention in its folded or collapsed position.

FIG. 3 is a perspective view of the stair-climbing wheel chair of the present invention in an extended position while it is traversing a flight of stairs.

FIG. 4 is a perspective view of the basic frame of the stair-climbing wheel chair of the present invention showing the attitude control means.

FIG. 4a is an enlarged portion of FIG. 4 showing the catch means portion thereof.

FIG. 5 shows the wheel chair of FIG. 4 in a position traversing a flight of stairs.

FIG. 6 is a schematic diagram of the operator means portion of the attitude control means.

FIGS. 6a, 6b and 6c show the extend, lock and retract positions, respectively, of the four-way valve.

FIG. 7 is a schematic diagram of an alternative attitude control means.

FIG. 8 shows the wheel chair of FIG. 7 in a position traversing a flight of stairs.

FIG. 9 is a schematic cross-sectional front view of the drive wheels, stair traction means and grab means of the present invention.

FIG. 10 is a plan view of the stair traction means of the present invention.

FIG. 12 is an exploded view of the differential gear means, transmission gear means and control means of the present invention.

FIG. 18 is an assembled end view of the first shift means of the present invention.

FIG. 19 is an assembled end view of the governor means of the present invention with its first escapement pawl engaged.

FIG. 20 is the same view as FIG. 19 with the second escapement pawl of the governor means engaged.

FIG. 21 is an assembled cross-sectional side view of the second shift means of the present invention when the transmission gear means is disengaged.

FIG. 22 is an assembled end view of the control means and governor means disengaged by the first shift means.

FIG. 23 is an enlarged view of a portion of FIG. 21.

Figure 11A:
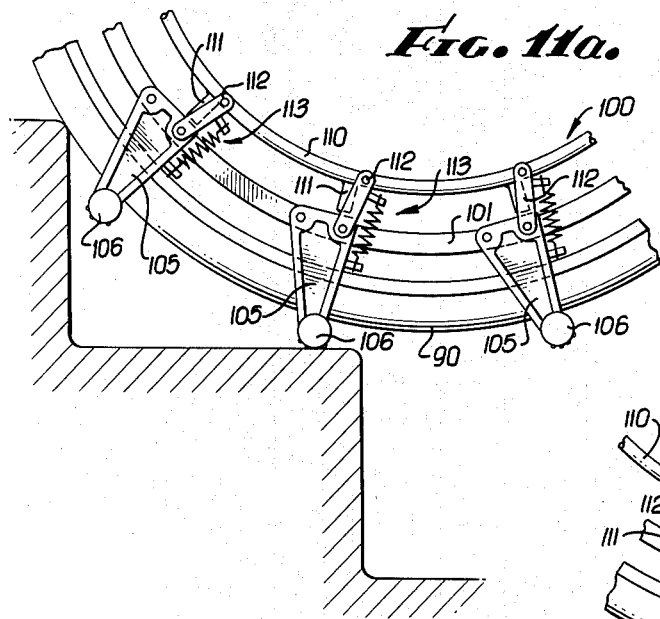
FIG. 11 is an enlarged view of a portion of FIG. 10 with FIG. 11a showing the stair traction means in an extended position on a stairway and FIG. 11b showing the stair traction means in a retracted position on a level surface.

As illustrated in FIGS. 1-6 and 9-23, the preferred embodiment of the stair-climbing wheel chair of the present invention involves: (a) A foldable central chair means 30 for seating an occupant; (b) an attitude control means 40 for regulating the angle of said chair means 30 with respect to the surface supporting said wheel chair; (c) a drive wheel 90 mounted on each side of the chair means 30 on a drive wheel hub 91 for supporting the rear end of the wheel chair; (d) retractable stair traction means 100 rotatably mounted on each side of said chair means for engaging the steps of the stair; (e) a grab means 120 rotatably mounted on each side of said chair means for gripping by the wheel chair occupant; (f) a differential gear means 130 operatively connecting the drive wheel 90, stair traction means 100 and grab means 120 on each side of said chair means 30; (g) transmission gear means 140 operatively connecting the grab means 120 and differential gear means 130 on each side of the chair means 30; (h) a control means 150 operatively connected to each of the grab means 120 for permitting rotation of said grab means to cause backward motion of the wheel chair while preventing rotation of grab means 120 to cause forward motion of the wheel chair; (i) a first shift means 160 operatively connected to said control means 150 for selectively disengaging said control means from said grab means 120; (j) a second shift means 170 operatively connected to each of said transmission and differential gear means 140 and 130, respectively; and (k) a governor means 190 for each of said drive wheels 90 for controlling the forward speed of said wheel chair.

CHAIR MEANS AND ATTITUDE CONTROL MEANS

In FIGS. 1–6, the stair-climbing wheel chair 25 of the present invention comprises a foldable central chair means 30 for seating an occupant. The chair means 30 may include two spaced side frame members 31 and 32 which may be simply a rigid rectangle of bars. Pivotally connecting the side frame members 31 and 32 are a rear cross-frame member 33 and a bottom cross-frame means 34, both of which are generally H-shaped with the central bars 33' and 34', respectively, forming a pivot connection adapted to pivot inwardly when the wheel chair 25 is folded. Each of the side frame means 31 and 32 may have a foot support 35 extending downwardly therefrom to accommodate the wheel chair occupant. It should be noted that the chair means 30 follows, generally, the conventional wheel chair construction so that detailed description is unnecessary.

Operatively connected to the chair means 30 is an attitude control means 40 for regulating the angle of chair means 30 with respect to the surface supporting the wheel chair 25. The attitude control means 40 includes a foldable front crossed frame means 41 having bars 42 and 43 on each side of the chair means 30 which are normally substantially vertical when the wheel chair 25 travels on horizontal surfaces. At the lower end of each of the bars 42 and 43 are swivel wheels 44 and 45, respectively, for supporting the front end of the wheel chair 25. Pivotally connecting the bars 42 and 43 is an H-frame 46 with a central pivot bar 47 adapted to pivot inwardly when the wheel chair 25 is folded.

Connecting the front cross frame means 41 to the chair means 30 is a link means 50 pivotally mounted on each side of the chair means 30. The link means 50 includes a first bar 51 pivotally connecting the upper rear portion of said chair means 30 to the upper portion of the front cross frame means 41. Also, the link means 50 includes a second bar 52 pivotally connecting the lower rear portion of the chair means 30 to the lower portion of the front cross frame means 41. Preferably, the link means also includes a catch means 53, as illustrated in FIG. 4a, for holding the link means 50 rigidly adjacent the chair means 30 when the wheel chair 25 travels on a level surface. As illustrated, the catch means 53 may comprise simply a slot 54 in the side frame means, such as the side frame means 31, and a lug 55 mounted on the front cross frame means, such as on bar 42, with the lug 55 adapted to be slidably engaged in the slot 54.

The attitude control means 40 also includes operator means 60 for positioning the front cross frame means 41 with respect to the chair means 30. The operator means 60 includes a hydraulically-actuated piston and cylinder 61 pivotally connecting each side of the front portion of the chair means 30 to the front cross frame means 41. Operatively connected to each of the piston and cylinders 61 is pump means 62 for extending and retracting each of said piston and cylinders. Each of the pump means 62 includes a pair of plastic bellows 63 and 64, each of which is connected to one end of a rocker arm 65. The rocker arm 65 is pivotally connected to the chair means 30 so that rotation forward simultaneously contracts the bellows 64 and expands the bellows 63 and rotation rearwardly simultaneously expands the bellows 64 and contracts the bellows 63.

The bellows 64 is interconnected with a reservoir tank 66 and the piston and cylinder 61 through a four-way valve 67 by means of conduits 68, 69, 70 and 71. The conduits 70 and 71 connecting the bellows 64 with the four-way valve 67 each have a check valve 72 and 73, respectively, therein. The check valve 72 which may be a simple ball, poppet or flapper valve, is adapted to permit hydraulic fluid flow solely from the bellows 64 to the four-way valve 67. The check valve 73 is adapted to permit hydraulic fluid flow solely from the four-way valve 67 to the bellows 64. The bellows 63, similar to the bellows 64, is interconnected through the reservoir tank 66 and the piston and cylinder 61 through the four-way valve 67 by conduits 68, 69, 70 and 71. Also, the bellows 63 has a check valve 74 in the conduit 70 adapted to permit the hydraulic fluid flow from the bellows 63 to the four-way valve 67. Similarly, the bellows 63 has a check valve 75 in the conduit 71 adapted to permit fluid flow solely from the four-way check valve 67 to the plastic bellows 63. As illustrated in FIG. 6, the four-way valve 66 can be selectively located in three positions, i.e. extend (FIG. 6a), lock (FIG. 6b), and retract (FIG. 6c) by a lever 76.

The molded plastic bellows provide the dual function of fluid displacement during the compression stroke and spring return to normal during the intake stroke. The "rings" of the bellows 63 and 64 provide the reaction to the ring load of the hydrostatic force and hold the shape of the pump. The ratio of the bellows 63 and 64 diameter to the cylinder diameter of the piston and cylinder 61 provides the required hydraulic advantage, and the lever length of the rocker arm 65 provides a further mechanical advantage. As illustrated, each piston and cylinder 61 has its corresponding pump means 62. However, as shown in dotted lines in FIG. 6, both of the piston and cylinders 61 may be connected to a single pump means for one-hand operation by the wheel chair occupant.

The operation of folding and unfolding the chair means 30 of the present invention is apparent from observation of FIGS. 1 and 2 and corresponds to the folding and unfolding of the present conventional wheel chair. The operation of the attitude control means can easily be seen from FIGS. 3–6. If, for example, the wheel chair occupant desires to climb a flight of stairs, then he merely positions the rear of the wheel chair adjacent to the bottom of the stairs. The lever 76 is then rotated to position the four-way valve 67 in its extend position, as illustrated in FIG. 6a. The rocker arm 65 of the pump means 62 is then rotated back and forth to pump liquid from the reservoir tank 66 into the piston and cylinder 61 on each side of the wheel chair. Such extension of the piston and cylinder 61 causes the front cross frame means 41 to extend to the position illustrated in FIGS. 3 and 5. The lever 76 is then moved to its center or lock position to retain the extended position of the piston and cylinders 61. After the stairs have been climbed, the piston and cylinders 61 may be retracted by moving the lever 76 to the retract position, as illustrated in FIG. 6c, and then rotating the rocker arm 65 of the pump means 62 back and forth to return the hydraulic fluid from the piston and cylinders 61 to the reservoir tank 66. The wheel chair then returns to the position shown in FIGS. 1 and 4.

In FIGS. 7 and 8, an alternattive link means 80 is schematically illustrated. As shown in FIGS. 7 and 8, the link means 80 includes a first bar 81 pivotally connecting the upper front portion of the chair means 30 to the chair means axle 92. A second bar 82 pivotally connects the upper rear portion of the chair means 30 to the front cross frame means 41. A third bar 83 pivotally connects the chair means axle 92 to the front cross frame means 41. The position of the front cross frame means 41 may be controlled by an operator means 60, including a piston and cylinder 61, as illustrated in FIGS. 1–6.

The important advantage of the preferred link means 50, as compared to the link means 80, is the rigid attachment of the drive wheels 90 to the chair means 30. This provides a basic mechanical integrity of the chair for rigidity and ruggedness. Further, the link means 50 provides a common spatial relationship between the chair means 30 and the drive wheels 90 in all configurations so that the pull angle remains constant for all attitudes. On the other hand, with the link means 80 the drive wheels 90 move with respect to the chair means 30 so that the height of the chair means 30 above the plane of the drive wheels 90 is reduced so that a greater sense of stability is achieved. Also, in the link means 80, the first movement is the leaning back of the chair means 30 without appreciable displacement of the center of gravity, and this ability to "lean back" is desirable for the relaxation of the wheel chair occupant. However, the link means 80 has the disadvantage of no fixed frame members between the chair means 30 and the drive wheels 90. This detracts from the rigidity and mechanical integrity of the chair. Furthermore, the pull point for the link means 80 tends to be in a rather awkward position when the chair is in its stair-climbing position. The drive wheels 90 move up into the arm pit of the wheel chair occupant. Also, there is no extension of the swivel wheels 44 and 45 to promote stability. Consequently, at present, the link means 50 is preferred to the link means 80, although variations of the link means 80 may be found more suitable in the future.

DRIVE WHEELS, STAIR TRACTION
MEANS AND GRAB MEANS

In FIGS. 9–11, the relationship between the drive wheels 90, stair traction means 100 and the grab means 120 are illustrated. A drive wheel 90 is mounted on each side of the chair means 30 on a drive wheel hub 91 by means of drive wheel spokes 93 for supporting the rear end of the wheel chair 25. The drive wheel hub 91 is in turn rotatably mounted on an axle 92 attached to the chair means 30. Rotatably mounted on each side of the chair means 30 is a retractable stair traction means 100 for engaging the steps of the stairs.

Figure 11B:
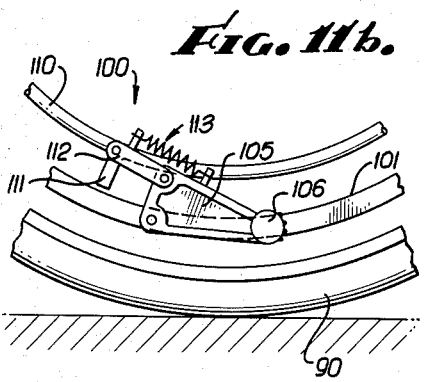

The stair traction means 100 comprises a carrier ring 101 mounted on each side of the chair means 30 on a carrier ring hub 102 by means of the carrier spokes 103. The carrier ring 101 has a radius slightly less than the radius of the drive wheel 90 and the carrier ring hub 102 is rotatably mounted on the chair means axle 92. Around the circumference of each of the carrier rings 101 is mounted a plurality of pivotally-connected lugs 105. Each of the lugs 105 has an outer end 106 adapted to engage the stair steps. Also, the lugs 105 are adapted to have the outer end 106 selectively extended beyond the circumference of the drive wheel 90 and retracted within the circumference of the drive wheel 90. Pivotally connected to each of the lugs 105 on the carrier ring 101 is a handle ring 110. The handle ring 110 is mounted coaxially with respect to each of the drive wheels 90 and has a radius less than the radius of said drive wheels. Also, each handle ring 110 is adapted to move the lugs 105 between their extended and retracted positions which are illustrated in FIGS. 11a and 11b, respectively. The lugs 105 are mounted on the carrier ring 101 so that they are adapted to be maintained in their extended position by the force exerted on their outer end 106 by each stair step (see FIG. 11a). The handle ring 110 has a plurality of bosses 111 thereon adjacent the lugs 105 so that each lug 105 has a corresponding boss 111. The bosses 111 are adapted to maintain the lugs 105 in their extended position, as illustrated in FIG. 11a. Adjacent each of the pivot links 112 connecting the lugs 105 with the handle ring 110 is mounted a spring means 113. Spring means 113 is adapted to selectively maintain the lugs 105 in their extended position and their retracted position. Thus, the spring means 113 acts as an overcenter hold-open-hold-closed spring. Consequently, there are three independent devices holding the lug 105 in its extended position, i.e., the stair step on which the lug 105 is acting, the boss 111 on the handle ring 110, and the spring means 113. Since all the lugs 105 are connected to the common handle ring 110, all of the lugs 105 extend and retract together so that all of the spring means 113 act together to hold the lugs 105 in the extended or retracted position. The outer end 106 of the lug 105 is designed to have maximum traction on any type of stair step or curbstone at any height or angle. It is probable that this type of lug is capable of climbing a curb at least equal in height to about one-third of the drive wheel diameter. Preferably, the individual lugs 105 may be made of a plastic material with good resistance to wear and reinforced with a spring wire frame and embedded therein and metal journal inserts to provide additional strength.

The grab means 120 are rotatably mounted on each side of the chair means 30 for gripping by the wheel chair occupant. Thus, the grab means 120 comprises a grab ring hub 121 rotatably mounted on each of the chair means axle 92. Also, the grab means 120 includes a grab ring 122 coaxially mounted on the grab ring hub 121 by grab spokes 123. The grab ring 122 has a radius slightly less than the radius of its corresponding drive wheel 90.

The operation of the drive wheel 90 and the grab means 120 is obvious from FIGS. 9–11 and substantially similar to the conventional wheel chair when they are located together as discussed below. The stair traction means 100 is simply operated by the wheel chair occupant merely by rotating the handle ring 110 in the direction to extend the lugs 105. After the stairs have been climbed, the lugs 105 may be retracted by rotation of the handle ring 110 in the opposite direction. As noted above, during the stair-climbing operation the lugs 105 are maintained in their extended position by the load thereon from the stair steps in addition to the operation of the bosses 111 on the handle ring 110 and the spring means 113.

DIFFERENTIAL GEAR MEANS

From the description of the drive wheels 90, the stair traction means 100 and the grab means 120 on each side of the chair means 30, it can be seen that, if desired, the stair traction means 100 could be mounted directly on the drive wheel 90 and thus the carrier ring hub 102 could be eliminated. However, the spacing of the lugs 105 around the circumference of the carrier ring 101 will seldom, if ever, exactly match the spacing of the stair steps which the wheel chair is traversing. Consequently, with such arrangement, there would necessarily be a small amount of sliding and then a bump as the wheel chair ascended or descended each step when the drive wheel 90 would slide around until a lug 105 engaged the edge of the stair step. Such bumping gives an undesirably roung ride and even a small amount of sliding would not contribute to the sense of security of the wheel chair occupant during the traverse of a long flight of stairs. Consequently, a differential gear means 130 has been incorporated in the wheel chair 25 of the present invention for operatively connecting the drive wheel 90, stair traction means 100, and the grab means 120 on each side of the chair means 30. The differential gear means 130 is adapted to rotate the drive wheel 90 and the stair traction means 100 by the rotation of the grab means 120. Also, the differential gear means 130 is adapted to permit the stair traction means 100 to overrun the drive wheel 90 and to prevent the drive wheel 90 from overrunning the stair traction means 100. With such arrangement, the aforementioned sliding and bumping problem is substantially eliminated.

Figure 13:
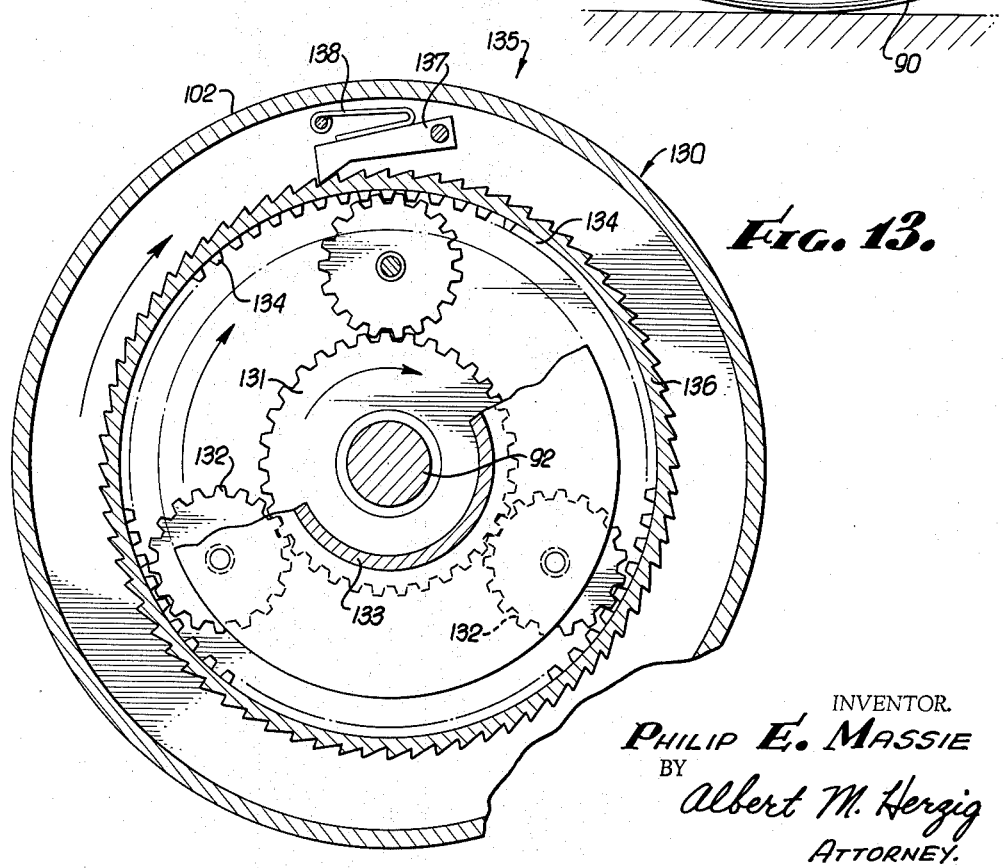
FIG. 13 is an assembled end view of the differential gear means of the present invention, taken from the chair side of the differential gear means taken on line 13—13 of FIG. 14.
Figure 14:
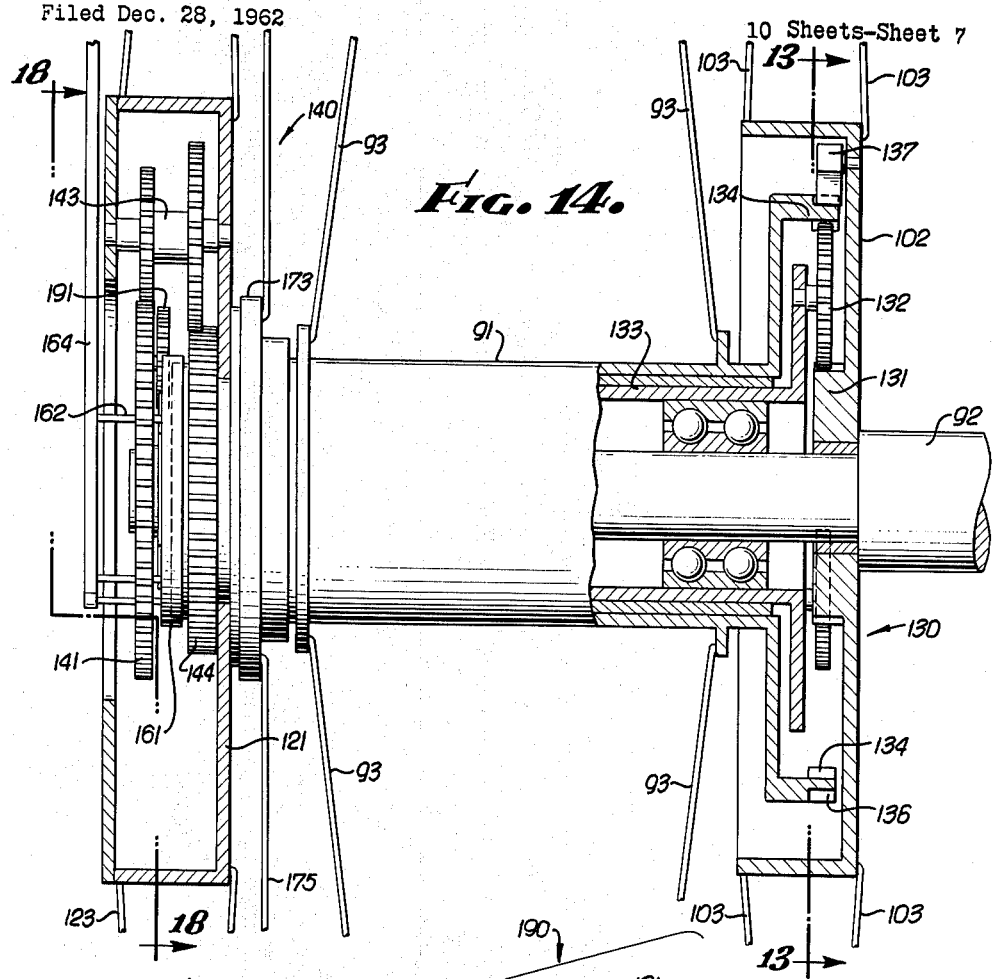
FIG. 14 is an assembled cross-sectional side view of the transmission and differential gear means of the present invention with the transmission gear means engaged.

As illustrated particularly in FIGS. 12–14, the differential gear means 130 includes a differential sun gear 131 coaxially mounted on the carrier ring hub 102. A plurality of differential planet gears 132 are rotatably mounted around and engaged with the differential sun gear 131. A jack shaft 133 is rotatably mounted on the chair means axle 92 and the differential planet gears 132 are rotatably mounted on the jack shaft 133. Rotatably mounted around and engaged with the planet gears 132 is a ring gear 134 which is mounted on the drive wheel hub 91. Operatively connected to the drive wheel hub 91 is a first ratchee means 135 which is adapted to prevent the drive wheel 90 from overrunning the stair traction means 100. The first ratchet means 135 includes a first ratchet rack 136 circumferentially mounted on the drive wheel hub 91. Engaged in the first ratchet rack 136 is a pawl 137 which is pivotally mounted on the carrier ring hub 102. The pawl 137 is biased into engagement with the rack 136 by means of a ratchet spring 138.

The operation of the differential gear means 130 can best be explained by analyzing the forces on the grab means 120, the drive wheel 90 and the stair traction means 100 when the wheel chair 25 is climbing a flight of stairs, as illustrated in FIG. 3. As described below, the torque applied on the grab ring 122 is transmitted through the transmission gear means 140 to the drive wheel 90 to cause it to rotate in a clockwise direction when the stairs are being ascended (observe the nearest drive wheel 90 in FIG. 3). On the other hand, the force exerted on the lugs 105 by the stair steps causes the carrier ring 101 to at least remain stationary. (Note that the force on the lugs 105 wound tend to cause the carrier ring 101 to rotate in a counterclockwise direction, but for purposes of simplicity of explanation it will be assumed that the carrier ring 101 is maintained stationary with respect to rotation about the chair means axle 92.) Under such conditions, it can be seen that the drive wheel 90 would rotate in a clockwise direction and overrun the stair traction means 100 unless such rotation is prevented. Such overruning of the stair traction means 100 by the drive wheel 90 is prevented by the first ratchet means 135 which prevents such rotation as illustrated in FIG. 13. In other words, when the drive wheel 90 is rotated in a clockwise direction the first ratchet means 135 causes it to rotate the stair traction means 100 in the same clockwise direction so that all of the torque exerted on the grab means 120 is loaded onto the lugs 105 of the stair traction means 100.

As just described, when the lug 105 engages the stair step, the wheel chair 25 is moved up the stairs simply by the rotation of the grab means 120 by the wheel chair occupant. However, as initially noted in this portion of the specification, the lug 105 will normally not initially contact the stair step when one of the preceding lugs 105 engages the next lower stair step. Under these conditions, the wheel 90 will ascend the next step to the point where the lug 105 engaging the next lower step just slips off such lower step and the wheel chair 25 is effectively balanced on the edge of said next step on the drive wheel 90. At this point, since there is no force exerted on the carrier ring 101 by the stair steps, i.e. none of the lugs 105 contact any of the stair steps, all of the torque exerted on the grab means 120 by the wheel chair occupant is loaded onto the unresisting carrier ring 101. Such torque quickly drives the carrier ring 101 into a position where the lug 105 contacts the next higher step and the equilibrium of forces discussed above in re-established. Furthermore, it should be noted that the diameter of the sun gear 131 is substantially smaller than the diameter of the ring gear 134 so that rotation past a given number of teeth represents larger angular movement for carrier ring 101 than the drive wheel 90. Consequently, the rapid re-establishment of the balance of forces is promoted by faster movement of the carrier ring 101 compared to the drive wheel 90.

TRANSMISSION GEAR MEANS

The added work required in stair climbing is well known to everyone, particularly those of advanced age and increased weight. For the person of limited physical capability, the reduction in work of rolling a smooth wheel over a smooth floor as opposed to walking is highly significant. Thus, for the stair-climbing wheel chair, an appreciable decrease in the rate of movement is to be expected due to the lower capability and the requirement of moving the weight of the chair as well as the occupant up the stairs. These facts of decreased movement rate and increased force imply some sort of torque or force multiplication.

In addition to the requirement of torque multiplication, there is the problem of the travel direction of the chair related to the arm pull direction. In normal operation of the front swivel wheel chair, the occupant reaches back and rotates the grab means forward and thus uses the flexor muscles of the arm and back for propulsion. The use of the flexor muscles is normally desirable due to the greater force available in these muscles as compared to the extensor muscles. Consequently, in stair climbing, the use of the flexor muscles is still desirable. Furthermore, it is desirable to reach back and pull forward so as to have the chair back for reaction to the arm load. The chair back reaction force tends to lift the front swivel wheels and thus reduce the "dead weight" on these wheels during the portion of the climb cycle when the swivel wheels must make a nearly vertical movement up the face of the stair step riser. For these reasons, it is desirable not only to have a toque multiplier transmission, but also a reversing gear to change the direction of the torque application, i.e. the rotation of the grab means 120 in the direction of "normally forward" travel while the chair is climbing the stairs in the reverse direction. However, it should be noted that by appropriate transmission design the pull utilized to climb stairs may be in either direction.

As shown particularly in FIGS. 12 and 14, the grab means 120 and the differential gear means 130 on each side of the chair means 30 are operatively connected by a transmission gear means 140. The transmission gear means 140 is adapted to transmit the torque exerted on the grab means 120 to the differential gear means 130 and to multiply said torque. As shown, the transmission gear means 140 includes a fixed transmission sun gear 141 mounted on the chair means axle 92 by the usual key-in-slot arrangement, i.e. the slot 142 in the transmission sun gear 141 is adapted to fixedly mount the transmission sun gear 141 on the chair means axle 92. Rotatably mounted around and engaged with said transmission sun gear 141 is a plurality of transmission planet cluster gears 143. The planet cluster gears 143 are rotatably mounted in the grab ring hub 121 of the grab means 120. Rotatably mounted on the chair means axle 92 is a moving transmission sun gear 144 which is engaged with said planet cluster gears 143. The moving sun gear 144 is fixed to the jack shaft 133 by the usual key-in-slot arrangement. Thus, the slot 144' in the moving transmission sun gear 144 is adapted to fixedly mount the transmission sun gear 144 on the jack shaft 133.

As illustrated in FIGS. 12 and 14, when torque is applied to the grab ring 122 such torque is transmitted to the grab ring hub 121, then to the planet cluster gears 143, then to the moving transmission sun gear 144, and finaly to the jack shaft 133. The distribution of the torque from the jack shaft 133 depends upon the operation of the differential gear means 130 which has been described above. It should be noted, however, that when the grab means 120 is rotated in a counterclockwise direction that the resulting rotation imparted to the jack shaft 133 is in a clockwise direction.

CONTROL MEANS AND FIRST SHIFT MEANS

As set forth above in connection with the description of the differential gear means 130 and the transmission gear means 140, a system is set forth which permits the wheel chair occupants to ascend a flight of stairs by rotating the grab means 120. However, as noted, climbing stairs is hard to work so that the wheel chair occupant will normally be required to rest at periodic intervals while climbing the steps. Furthermore, at the end of each pull stroke, the wheel chair occupant normally lets go of the grab means 120 to reposition his hands for another pull. During such period of freedom, as well as during the rest period, it is essential that the wheel chair have means to prevent it from rolling down the steps. Such result is achieved by control means 150. Operatively connected to each of the grab means 120 the control means 150 permits rotation of the grab means 120 to cause backward motion of the wheel chair while preventing rotation of the grab means 120 to cause forward motion of the wheel chair. In other words, where backward motion of the wheel chair is used to climb stairs, the control means 150 permits rotation of the grab means 120 to climb the stairs, but prevents rotation of the grab means 120 to cause the wheel chair to roll down the stairs.

Figure 15:
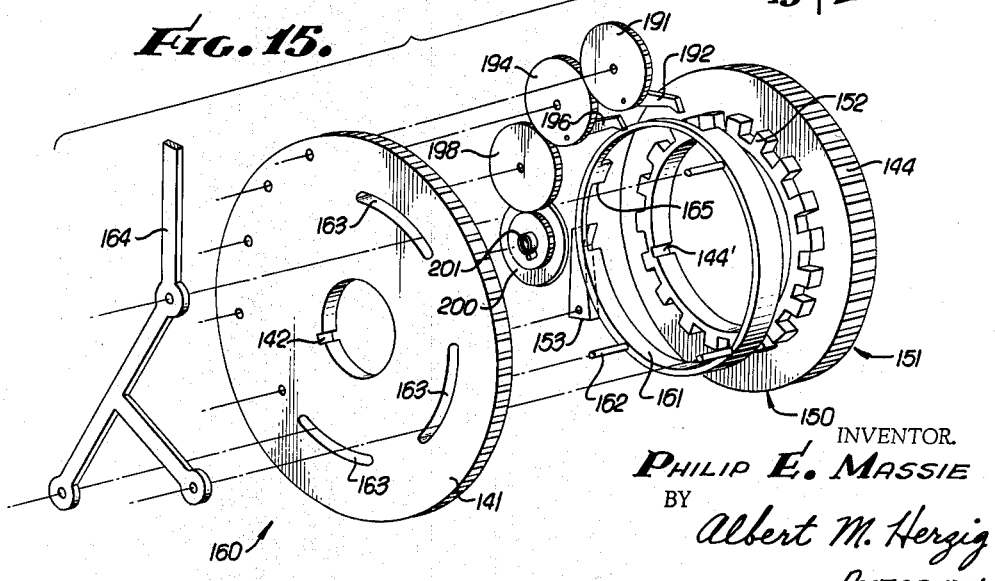
FIG. 15 is an exploded view of the control means and first shift means of the present invention.

As illustrated in FIGS. 12, 15, 19, 20 and 22, particularly, the control means 150 comprises a second ratchet means 151 which includes a circular ratchet rack 152 operatively connected to the grab means 120. As illustrated, the circular ratched rack 152 is in integral part of the moving transmission sun gear 144 which is connected to the grab means 120 as described in connection with the transmission gear means 140 set forth above. Mounted on the chair means axle 92 is at least one ratchet pawl 153 which is adapted to be engaged with the ratched rack 152. As illustrated, the ratched pawl 153 is pivotally mounted on the fixed transmission sun gear 141 and is biased into engagement with the ratched rack 152 by the pawl spring 154. The ratchet pawl 153 permits rotation of the ratched rack 152 and, consequently, the grab ring 120 only in one direction, i.e. as illustrated in FIGS. 12 and 15, only in clockwise direction. Of course, if desired, more than one ratched pawl 153 may be utilized to insure rotation of the circular ratchet rack 152 in the desired direction.

While the control means 150 is admirably adapted to prevent rolling of the wheel chair down a flight of stairs during the ascension of such stairs, it can easily be seen that the control means 150 is equally efficient in preventing forward motion of the wheel chair 25 when the wheel chair is on a level surface. Consequently, shift means are necessary to disengaged the control means 150 from the grab means 120 when the wheel chair 25 is on a level surface. As illustrated in FIGS. 12, 15, 19, 20 and 22, a first shift means 160 is operatively connected to the control means 150 for selectively disengaging the control means 150 from the grab means 120. The first shift means 160 includes a band 161 coaxially and rotatably mounted on the chair means axle 92 between the ratchet rack 152 and the ratchet pawl 153. As illustrated, the band 161 is rotatably mounted on the fixed sun gear 141 by means of pins 162 slidably mounted through slots 163 in the fixed sun gear 141. The other ends of the pins 162 are connected to the first shift lever 164 which is adapted to be operated by te wheel chair occupant. The first shift lever 164 preferably has a latching means (not shown) which permits the first shift lever 164 to be securely fixed to chair means 30 in the position chosen by the wheel chair occupant so that it cannot be accidentally operated during ascension of a flight of stairs. The band 161 has at least one slot 165 therein which is adapted to permit selectively the ratchet pawl 153 to engage the ratchet rack 152. FIGS. 19, 20 and 22 show the ratched pawl 153 disengaged.

As can be seen from FIG. 15, the operation of the shift means 160 involves merely rotating the band 161 so that the slot 165 is aligned with the ratchet pawl 153. Such alignment permits the ratchet pawl 153 to engage the circular ratchet rack 152 and to prevent forward motion of the wheel chair 25. When the band 161 is rotated by the lever 164 so that the slot 165 is no longer aligned with the ratchet pawl 153 (FIG. 22), the circular ratchet rack 152 is then permitted to rotate freely about the chair means axle 92 so that the wheel chair may move forward freely.

SECOND SHIFT MEANS

As described so far, a stair-climbing wheel chair is set forth which can safetly climb stairs and is adapted to turn on the stair landings. However, as noted additionally, approximately 95% of the time the wheel chair 25 will be utilized on level ground so that the portion of the mechanism utilized to climb the stairs, such as the differential gear means 130 and the transmission gear means 140, not only are useless but actually interfere with the easy forward motion of the wheel chair due to the frictional forces necessarily encountered therein. Consequently, to retain the freedom of movement of the wheel chair on level surfaces, it is desirable that each of the grab means 120 be directly connected to its corresponding drive wheel 90. Also, the differential gear means 130 and the transmission gear means 140 preferably should be disengaged and the stair traction means 100 also be locked directly to the grab means 120. As illustrated particularly in FIGS. 16, 17, 21 and 23, a second shift means 170 is operatively connected to each of the differential gear means and the transmission gear means 130 and 140, respectively. The second shift means 170 is adapted to disengage selectively the transmission gear means 140 and to lock selectively each of the grab means 120 directly to its corresponding drive wheel 90 and stair traction means 100.

The second shift means 170 comprises a track 171 coaxially mounted on the chair means axle 92 on the transmission gear means 130. As shown, the track 171 is mounted on the grab ring hub 121. The track 171 has a cam surface 172 which extends longitudinally along the chair means axle 92. Slidably mounted on the cam surface 172 of the track 171 is a collar 173. The collar 173 has a gear shift ring 174 attached thereto by spokes 175. Since the gear shift ring 174 is easily grasped by the wheel chair occupant, the collar 173 is adapted to be rotated by the wheel chair occupant. Furthermore, since the collar 173 is mounted on the cam surface 172 of the track 171, rotation of the collar 173 causes the collar 173 to move longitudinally along the chair means axle 92. The collar 173 has a groove 176 therein which slidably receives a ridge 177 on the drive wheel hub 91.

Mounted on the transmission gear means 140 is a first set of dogs 178. As illustrated, said first set of dogs 178 is coaxially mounted around the circumference of the chair means axle 92 on the grab ring hub 121. Mounted on the drive wheel hub 91 is a second set of dogs 179 which are also coaxially mounted around the circumference of the chair means axle 92. Mounted on the differential gear means 130 is a third set of dogs 180. As shown, the third set of dogs 180 is coaxially mounted around the circumference of the chair means axle 92 on the jack shaft 133. The third set of dogs 180 comprises a spline ring 181 circumferentially mounted on the jack shaft 133 with a rear shoulder 182 remote from grab ring hub 121. Slidably engaged in the spline ring 181 is a locking ring 183 and said locking ring 183 is biased to slide toward the grab ring hub 121 by a locking ring spring 184.

Figure 16:
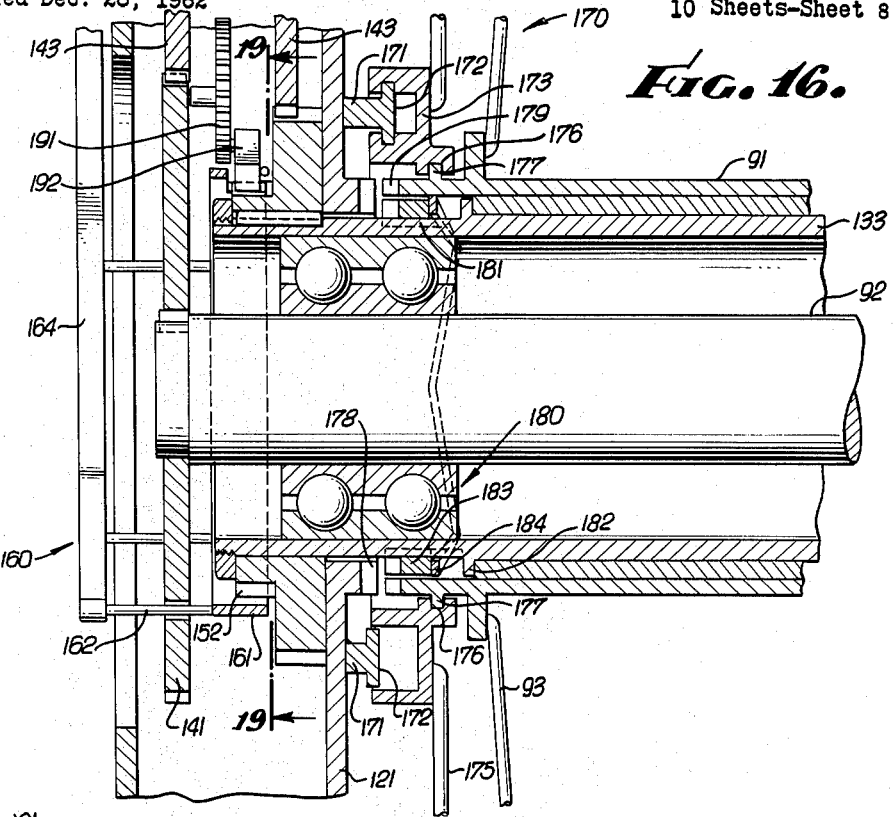
FIG. 16 is an assembled cross-sectional view of the control means, first shift means and second shift means of the present invention.
Figure 17:
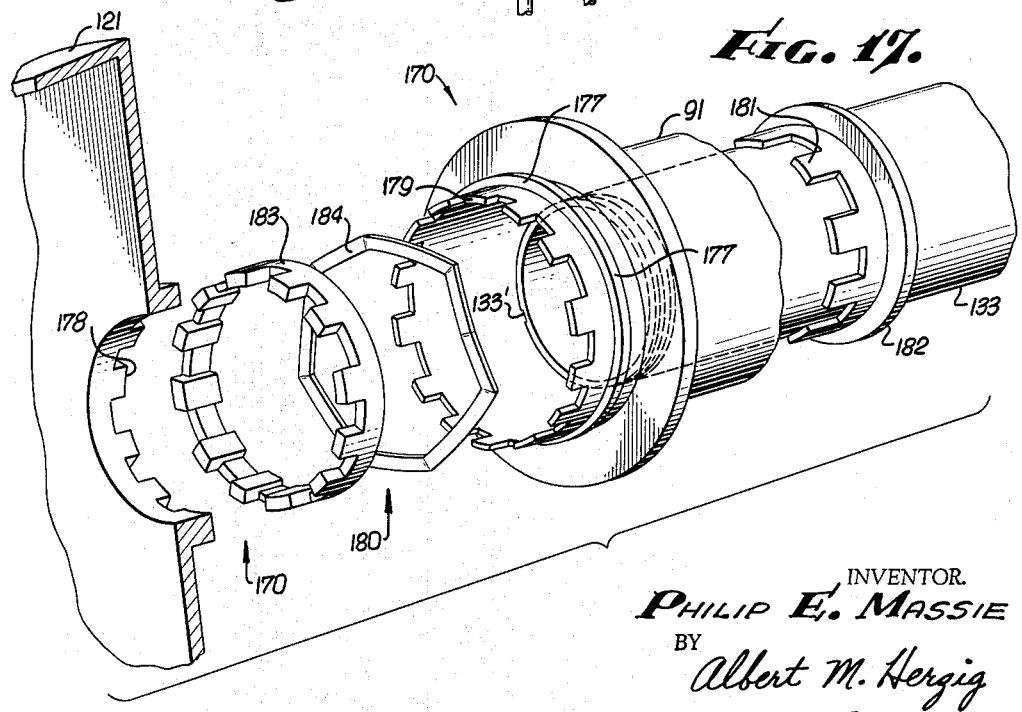
FIG. 17 is an exploded view of the second shift means of the present invention.

The operation of the second shift means 170 is initiated by the rotation of the gear shift ring 174 by the wheel chair occupant. FIG. 16 shows the transmission gear means 140 engaged and the grab means 120 connected to its drive wheel 90 and stair traction means 100 through the differential gear means 130. FIG. 21 shows the transmission gear means 140 disengaged and the grab means 120 locked directly to the drive wheel 90 as well as the stair traction means 100. Rotation of the gear shift ring 174 in turn causes rotation of the collar 173. As noted above, rotation of the collar 173 causes relative movement between the grab ring hub 121 and the collar 173 due to the slope of the cam surface 172 of the track 171. Such movement causes the grab ring hub 121 to move on the chair means axle 92 toward the drive wheel hub 91 and the jack shaft 133. Also, such movement of the grab ring hub 121 causes the planet cluster gears 143 mounted theron to move with respect to the fixed transmission sun gear 141 and the moving transmission sun gear 144. As illustrated in FIG. 21, such movement of the planet cluster gears 143 is sufficient to separate them from the fixed transmission sun gear 141 so that the transmission gear means 140 becomes effectively disengaged. However, the movement of the planet cluster gears 143 with respect to the moving sun gear 144 leaves them engaged with the moving transmission sun gear 144 because of the extra width of the sun gear 144. Such continued engagement of the planet cluster gears 143 and moving sun gear 144 is adapted to simplify re-engagement of the transmission by maintaining the proper alignment of the planet cluster gears 143. Thus, when the wheel chair occupant moves the gear shift ring 174 to re-engage the transmission gear means 140 by moving the grab ring hub 121 away from the drive wheel hub 91, the re-engagement of the planet cluster gears 143 with the fixed transmission sun gear 144 is simplified.

The movement of the grab ring hub 121 toward the drive wheel hub 91 causes the direct engagement of the first set of dogs 178 with the second set of dogs 179 so that the grab ring hub 121 is mechanically coupled with the drive wheel hub 91. However, initially the third set of dogs 180, as represented by the teeth of the locking ring 183 will normally not be aligned to be engaged with the first set of dogs 178 when the second set of dogs 179 is engaged with the first set of dogs 178. Consequently, the initial movement of the grab ring hub 121 toward the jack shaft 133 normally causes the locking ring 183 to retract in the spline ring 181 and seat against the shoulder 182. Under such condition the locking ring 183 compresses the locking ring spring 184 so that the locking ring 183 is biased toward the first set of dogs 178 as in FIG. 23. Consequently, after rotation of the jack shaft 133, when the locking ring teeth 183 do become aligned with the first set of dogs 178 so that engagement is possible, the locking ring spring 184 snaps the locking ring 183 toward the grab ring hub 121 and the third set of dogs 180 also becomes engaged with the first set of dogs. It can be seen that the transmission gear means 140 can be selectively re-engaged, and the drive wheel 90 and the stair traction means 100 can be selectively unlocked from the grab means 120 by the reverse rotation of the gear shift ring 174, as in FIG. 16. Such reverse rotation of the gear shift ring 174 causes the grab ring hub 121 to move away from the drive wheel hub 91 and the jack shaft 133 and the planet cluster gears 143 to re-engage the fixed transmission sun gear 141.

GOVERNOR MEANS

So far, in this application the construction and operation of a stair-climbing wheel chair has been described with respect to the ascent of stairs and travel on a level surface. However, such wheel chair must be able to also descend a flight of stairs. As described so far, the wheel chair of the present invention can descend stairs by the wheel chair occupant regulating the rate of descent by manually controlling the rotation of the grab ring 122. However, because of the combined weight of the wheel chair and the wheel chair occupant must be thus restrained and such restraint would have to be substantially continuous during descent, manual control is not a very satisfactory mode of regulating the rate of descent of the wheel chair 25 down a flight of stairs. Consequently, applicant's wheel chair 25 includes a governor means 190 for each of the drive wheels 90 for controlling the forward speed of the wheel chair, particularly during the descent of a flight of stairs. The governor means 190 also include a shift means 160 for selectively disengaging the governor means 190 when forward motion on a level surface is desired.

The governor means 190 comprises a circular ratchet rack 152 operatively connected to the corresponding drive wheel 90. As illustrated in FIGS. 15, 18, 19, 20 and 22, the circular ratchet rack 152 is coaxially mounted on the moving transmission sun gear 144 which is fixed to the jack shaft 133 of the differential gear means 130. Rotatably mounted adjacent to the ratchet rack 152 is a first escapement gear 191. As shown, the first escapement gear 191 is rotatably mounted on the fixed transmission sun gear 141. Rotatably mounted on the first escapement gear 191 is a first escapement pawl 192. The first escapement pawl 192 is adapted to be engaged with the ratchet rack 152 and has a lift spring 193 attached thereto. Rotatably mounted adjacent the ratchet rack 152 is a second escapement gear 194 which is engaged with the first escapement gear 191. As shown, the second escapement gear 194 is also rotatably mounted on the fixed transmission sun gear 141. The second escapement gear 194 is connected to the first escapement pawl lift spring 193 by means of a set of pins 195. The set of pins 195 constitutes lift spring operating means for alternately engaging and disengaging the first escapement pawl 192. Rotatably mounted on the second escapement gear 194 is a second escapement pawl 196 adapted to be engaged with the ratchet rack 152. The second escapement pawl 196 has a lift spring 197 attached thereto. Rotatably mounted adjacent the ratchet rack 152 is a third escapement gear 198 which is engaged with the second escapement gear 194. As shown, the third escapement gear is rotatably mounted on the fixed transmission sun gear 141. The third escapement gear 198 is connected to the second escapement pawl lift spring 197 by means of a set of pins 199. The set of pins 199 constitutes lift spring operating means for alternately engaging and disengaging the second escapement pawl 196. Rotatably mounted adjacent the ratchet rack 152 is a flywheel gear 200 which is engaged with the third escapement gear 198. As shown, the flywheel gear 200 is also rotatably mounted on the fixed transmission sun gear 141. One of the escapement pawls 192 or 196 is biased into engagement with the ratchet rack 152 by means of a coiled spring 201 attached to the flywheel gear 200 and the sun gear 141 so that the operation of the governor means 190 is immediately initiated upon the rotation of the circular ratchet rack 152.

The operation of the governor means 190 is similar to the usual operation of an escapement mechanism, i.e. it permits the controlled release of the energy of the wheel chair descending the stairs so that the rate of descent is regulated. As described above, the forward motion of the wheel chair 25 descending a flight of stairs causes the circular ratchet rack 152 to rotate in the direction indicated in FIGS. 19 and 20. Assuming that initially the first escapement pawl 192 is engaged with the circular ratchet rack 152 and the second escapement pawl 196 is disengaged therefrom, the rotation of the ratchet rack 152 causes the three escapement gears 191, 194 and 198 and the flywheel gear 200 to rotate in the directions indicated in FIG. 19 due to the force applied to the first escapement pawl 192 by the circular ratchet rack 152. Such rotation will build up slowly due to the inertia of the flywheel gear 200. As the rotation continues, at some point the second escapement pawl 196 will drop into engagement with the circular ratchet rack 152 because the rotation of the second escapement gear 194 and third escapement gear 198 urges the second escapement pawl 196 in such direction, as illustrated in FIG. 19. Since the second escapement pawl 196 is moving in a direction opposite the rotation of the circular ratchet rack 152, it contacts the rack tooth and the inertia of the flywheel gear 200 causes over-run rotation of the second escapement gear 194 so that the second escapement pawl 196 will pick up the load of the descending wheel chair 25. When the first escapement pawl 192 is thus unloaded, the lift spring 193 wil produce complete disengagement of the first escapement pawl 192 from the circular ratchet rack 152.

As illustrated in FIG. 20, after the second escapement pawl 196 is thus engaged and the first escapement pawl 192 is thus disengaged, the rotation of the three escapement gears 191, 194 and 198, and the flywheel gear 200 is reversed. Also, inertia of the flywheel gear 200 requires appreciable time to stop and reverse. With continued rotation of the circular ratchet rack 152, the reverse cycle occurs and the first escapement pawl 192 is again engaged with the circular ratchet rack 152 and the second escapement pawl 196 is desingaged therefrom. Thus a full cycle of the governor operation is established and the rate of descent of the wheel chair 25 is regulated by the inertia of the flywheel gear 200.

While the governor means 190 performs the important function of regulating the forward motion of the wheel chair 25 as it descends stairs, it can be seen that such regulating may not be desired when the wheel chair is moving forward on a level surface. In other words, similar to the control means 150, the governor means 190 preferably should include shift means for selectively disengaging it. Conveniently, the wheel chair 25 of the present invention has incorporated such shift means as part of the first shift means 160, since the circular ratchet rack 152 portion of the control means 150 has been conveniently utilized in the governor means 190. Thus, the shift means 160 serves both the control means 150 and the governor means 190. As set forth above, the first shift means 160 includes a band 161 coaxially and rotatably mounted with respect to the circular ratchet rack 152 between the ratchet rack 152 and the escapement pawls 192 and 196. The band 161 has slots 165 therein which are adapted to permit selectively the escapement of pawls 192 and 196 to engage the ratchet rack 152. The operation of the shift means 160 is the same as set forth above in that when it is desired to engage the governor means 190 with the circular ratchet rack 152, the slots 165 are aligned with the escapement pawls 192 and 196 so that they may become engaged with a circular ratchet rack 152. Preferably, the slots 165 in the band 161 are positioned to disengage the ratchet pawl 153 of the control means 150 first and then, on continued rotation of the band 161, disengage the escapement pawls 192 and 196. Thus, the control means 150 may be regulated separately from the governor means 190, although a single first shift means 160 is used to operate both of them. Also, it should be noted that, if desired, the governor means 190 may be engaged during the ascent of a flight of stairs. Thus, if the control means 150 should fail for any reason, the governor means 190 would regulate the rate of descent down the stairs.

OPERATION

In the foregoing part of this application applicant has described the operation of the individual portions of the system so that only the overall operation of the system remains to be described. Assuming the wheel chair occupant initially is moving forward across a level surface, the first shift means is positioned to disengage the control means 150 and the governor means 190. Also, both the attitude control means 40 and their stair traction means 100 are in their retracted positions. Finally, the the second shift means 170 is positioned to disengage the transmission gear means 140 and to lock the grab means 120 directly to the drive wheel 90 and the stair traction means 100.

Upon reaching the bottom of a flight of stairs, the wheel chair occupant would turn the wheel chair 25 around so that the rear of the chair faces the flight of stairs. The attitude control means 40, more particularly in the front cross frame means 41, are then extended an amount to compensate for the rise of one or more steps of the flight of stairs. The said traction means 100 is extended and the first shift means 160 is positioned to engage the control means 150 and the governor means 190. Also, the second shift means 170 is positioned to engage the transmission gear means 140 and unlock the stair traction means 100 and the drive wheels 90 from the grab means 120 so that the grab means 120 is connected thereto through the differential gear means 130. The wheel chair occupant may then ascend the stairs. If necessary, further extension of the attitude control means 40 may be made to compensate for more steps after the wheel chair 25 has ascended the first few steps of the stair.

After the flight of stairs has been ascended, the various portions of the system are returned to their initial position for further forward motion on a level surface. When the wheel chair occupant desires to subsequently descend a flight of stairs, the attitude control means 40 is again extended an amount to compensate for the height of one or more steps. The stair traction means 100 is extended and the first shift means 160 is positioned to engage solely the governor means 190 while leaving the control means 150 disengaged. Also, the second shift means 170 is positioned to engage the transmission gear means and connect means 120 to the drive wheel 90 and the stair traction means 100, as in the case of the ascending stairs. The flight of stairs may be then descended. After descent, the portions of the wheel chair are returned to their initial position for forward motion on a level surface.

Many other specific embodiments of the present invention will be obvious to one skilled in the art in view of this disclosure. As already noted, for example, the various link means 50 and 80 may be utilized in the attitude control means 40. Also, the operator means 60 in the attitude control means 40 may utilize a multiple section, telescoping work screw operator instead of the hydraulically-actuated piston and cylinder described. However, the hydraulically-actuated piston and cylinder is preferred, since the worm screw would probably be too heavy, too difficult to manufacture, and relatively slow in operation. Furthermore, separately operated worm screws would be required for each side of the chair while the hydraulically-actuated piston and cylinder may be operated from a single pump. In addition, the governor means 190 may utilize only three escapement gears where the third escapement has sufficient angular momentum to function as a flywheel. Also, the lift springs for the pawls may be connected to the fixed sun gear by a pair of springs for each pawl which alternately lower and raise the pawl.

In addition to the specific features already noted with respect to the wheel chair of the present invention, a small level bubble may be installed in one chair arm to assist in determining the attitude of the chair on the sloping plane of the stairs. Such level bubble would be an aid in overcoming the optical illusions present in connection with a sloping plane that might cause the wheel chair occupant to put the chair in an unstable position. Furthermore, a swivel lock may be placed on one or both of the swivel wheels to assure proper alignment of the swivel wheel and directional control on the stairs. Such swivel lock may be of the detent type or an expanding or contracting friction brake, with the detent type providing a fixed reference point to assure the proper alignment of the swivel wheel.

As described, the transmission gear means 140 utilizing a compound reversing gear system has been shown. However, many other gear systems may be utilized, such as a simple reversing gear system or a compound forward gear system. However, the compound reversing gear system is preferred since it gives a higher mechanical advantage compared to the simple gear system and it permits the use of the flexor muscles, as noted above, compared to the use of the extensor muscles in connection with the forward gear system. Also, it should be noted that an additional safety factor may be incorporated in the wheel chair 25 by means of a small friction brake used in conjunction with the flywheel 200 of the governor means 190. Such friction means in effect provides a double safety ratchet, since one of the escapement pawls will always be in contact with the ratchet rack.

Finally, it should be noted that, if desired, an auxiliary power means, such as a motor, may be added to the chair simply because of the gear system involved. However, such auxiliary power means would compromise the folding ability and increase the cost and weight of the wheel chair. Also, such auxiliary power means as in the prior art stair-climbing wheel chairs decreases the flexibility of the chair for normal operation.

There are many features in the present invention which clearly show the significant advance the present invention represents over the prior art. Consequently, only a few of the more outstanding features will be pointed out to illustrate the unexpected and unusual results attained by the present invention. The combination of the drive wheel 90, stair traction means 100, the transmission and differential gear means 140 and 130, the grab means 120, the control means 150, and the governor means 190 provide a stair-climbing wheel chair securing good contact with the stair steps, regardless of spacing. Furthermore, roll-back during ascension of the stairs is prevented and the speed descending the stairs is positively limited. All of these functions are contained in a small package, i.e. the drive wheel hub 91, using a planetary transmission gear means 140 so that the wheel hub is not significantly widened. Furthermore, simple controls, such as the first shift means 160 and the second shift means 170 permits easy conversion from operation on a flight of stairs to operation on a level surface.

In addition, it should be noted that the folding operation of the wheel chair is substantially similar to the conventional non-climbing wheel chair. The added linkage for the attitude control means 40 and the transmission and differential gear means 140 and 130 add very little to the weight of the stair-climbing wheel chair so that it continues to be easily manipulated by the wheel chair occupant. For example, the stair-climbing wheel chair of the present invention can be folded by the wheel chair occupant and placed in a car without assistance.

Also, the stair-climbing wheel chair of the present invention includes an attitude control means which easily and simply regulates the angle of the chair means with respect to the surface supporting the chair. In addition, a stair traction means for simply adapting the wheel for engagement with the steps of the stairs is set forth along with a transmission and differential gear means which is very compact and adapted to be fit in the hub of the drive wheel on a wheel chair. Finally a governor means is set forth for regulating positively the rate of rotation of a wheel.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:
1. An occupant-driven foldable stair-climbing wheel chair adapted to safely climb stairs and turn on the stair landings comprising:
(a) a foldable central chair means for seating an occupant;
(b) an attitude control means for regulating the angle of said chair means with respect to the surface supporting said wheel chair;
(c) a drive wheel mounted on each side of said chair means on a drive wheel hub for supporting the rear end of said wheel chair, said drive wheel hub being rotatably mounted on an axle attached to said chair means;

(d) retractable stair traction means rotatably mounted on each side of said chair means for engaging the steps of the stairs;
(e) grab means mounted on each side of said chair means for gripping by the wheel chair occupant and for rotating said drive wheels and stair traction means;
(f) a differential gear means operatively connecting the drive wheel, stair traction means and grab means on each side of said chair means, said differential gear means adapted to rotate the drive wheel and stair traction means by rotation of said grab means to permit the stair traction means to overrun the drive wheel and to prevent the drive wheel from overrunning the stair traction means;
(g) a transmission gear means operatively connecting the grab means and differential gear means on each side of said chair means, said transmission gear means being adapted to transmit the torque exerted on said grab means to said differential gear means and to multiply said torque;
(h) a control means operatively connected to each of said grab means for permitting rotation of said grab means to cause backward motion of said wheel chair while preventing rotation of said grab means to cause forward motion of said wheel chair;
(i) a first shift means operatively connected to said control means for selectively disengaging said control means from said grab means; and
(j) a second shift means operatively connected to each of said transmission and differential gear means, said shift means being adapted to disengage selectively said transmission gear means and to lock selectively each of said grab means directly to its corresponding drive wheel and stair traction means.

2. A wheel chair as stated in claim 1 wherein said attitude control means comprises:
(a) a foldable front cross frame means having two spaced swivel wheels for supporting the front end of said wheel chair;
(b) a link means pivotally mounted on each side of said chair means connecting said cross frame means to said chair means; and
(c) operator means for positioning said front cross frame means with respect to said chair means.

3. A wheel chair as stated in claim 2, wherein said link means comprises:
(a) a first bar pivotally connecting the upper rear portion of said chair means to the upper portion of said front cross frame means; and
(b) a second bar pivotally connecting the lower rear portion of said chair means to the lower portion of said front cross frame means.

4. A wheel chair as stated in claim 3 wherein said link means has catch means for holding said link means rigidly adjacent said chair means when said wheel chair travels on a level surface.

5. A wheel chair as stated in claim 2, wherein said link means comprises:
(a) a first bar pivotally connecting the upper front portion of said chair means to said chair means axle;
(b) a second bar pivotally connecting the upper rear portion of said chair means to said front cross frame means; and
(c) a third bar pivotally connecting the chair means axle to said front cross frame means.

6. A wheel chair as stated in claim 2, wherein said operator means comprises:
(a) an hydraulically-actuated piston and cylinder pivotally connecting each side of the front portion of said chair to said front cross frame means; and
(b) pump means extending and retracting said piston and cylinders.

7. A wheel chair as stated in claim 1 wherein said stair traction means comprises:

(a) a carrier ring mounted on each side of said chair means on a carrier ring hub, said carrier ring having a radius slightly less than the radius of said drive wheel and said carrier ring hub being rotatably mounted on said chair means axle;
(b) a plurality of lugs pivotally mounted around the circumference of each of said carrier rings, each of said lugs having an outer end adapted to engage stair steps and being adapted to have said outer end selectively extended beyond the circumference of said drive wheels and retracted within the circumference of said drive wheels;
(c) a handle ring pivotally connected to the lugs on each of said carrier rings and mounted coaxially with respect to each of said drive wheels, each of said handle rings having a radius less than the radius of each of said drive wheels and being adapted to move said lugs between their extended and retracted position.

8. A wheel chair as stated in claim 7 wherein each of said lugs is adapted to be maintained in its extended position by the force exerted thereon by the stair step.

9. A wheel chair as stated in claim 7 wherein said handle ring has a plurality of bosses thereon adjacent to said lugs so that each lug has a corresponding boss and said bosses are adapted to maintain said lugs in their extended position.

10. A wheel chair as stated in claim 7 which includes spring means mounted adjacent each of the pivot connections between said lugs and said handle ring and said spring means is adapted to selectively maintain said lugs in their extended position and their retracted position.

11. A wheel chair as stated in claim 1 wherein said grab means comprises:
(a) a grab ring hub rotatably mounted on each of said chair means axles; and
(b) a grab ring coaxially mounted on each of said grab ring hubs having a radius slightly less than the radius of its corresponding drive wheel.

12. A wheel chair as stated in claim 1 wherein said differential gear means comprises:
(a) a differential sun gear coaxially mounted on said carrier ring hub;
(b) a plurality of differential planet gears rotatably mounted around and engaged with said sun gear;
(c) a jack shaft rotatably mounted on said chair means axle, said planet gears being mounted on said jack shaft;
(d) a ring gear rotatably mounted around and engaged with said planet gears, said ring gear being mounted on said drive wheel hub; and
(e) a first ratchet means operatively connected to said drive wheel hub, said ratchet means being adapted to prevent said drive wheel from overrunning said stair traction means.

13. A wheel chair as stated in claim 1 wherein said transmission gear means comprises:
(a) a fixed transmission sun gear mounted on said chair means axle;
(b) a plurality of transmission planet cluster gears rotatably mounted around and engaged with said sun gear, said planet cluster gears being mounted on said grab means;
(c) a moving transmission sun gear rotatably mounted on said chair means axle and engaged with said planet cluster gears, said moving sun gear being fixed to said jack shaft.

14. A wheel chair as stated in claim 1 wherein said control means comprises a second ratchet means including a circular ratchet rack operatively connected to said grab means and at least one ratchet pawl mounted on said chair means axle and adapted to be engaged with said ratchet rack.

15. A wheel chair as stated in claim 14 wherein said first shift means comprises a band coaxially and rotatably mounted on said chair means axle between said ratchet rack and said ratchet pawl, said band having at least one slot therein adapted to permit selectively said ratchet pawl to engage said ratchet rack.

16. A wheel chair as stated in claim 1 wherein said second shift means comprises:
 (a) a track coaxially mounted on said chair means axle on said transmission gear means, said track having a cam surface which extends longitudinally along said chair means axle;
 (b) a collar slidably mounted on said track and adapted to be rotated by the wheel chair occupant, said collar being operatively connected to said drive wheel hub and said differential gear means;
 (c) a first set of dogs mounted on said transmission gear means;
 (d) a second set of dogs mounted on said drive wheel hub;
 (e) a third set of dogs mounted on said differential gear means, said first, second and third set of dogs being adapted to be engaged selectively by the rotation of said collar on said track.

17. A wheel chair as stated in claim 1 which includes a governor means for each of said drive wheels for controlling the forward speed of said wheel chair.

18. A wheel chair as stated in claim 17 wherein said governor means includes shift means for selectively disengaging said governor means.

19. A wheel chair as stated in claim 17 wherein each of said governor means comprises:
 (a) a circular ratchet rack operatively connected to its corresponding drive wheel;
 (b) a first escapement gear rotatably mounted adjacent to said ratchet rack;
 (c) a first escapement pawl rotatably mounted on said first escapement gear and adapted to be engaged with said ratchet rack, said pawl having a lift spring attached thereto;
 (d) a second escapement gear rotatably mounted adjacent to said ratchet rack, said second escapement gear being engaged with said first escapement gear and being connected to said first escapement pawl lift spring;
 (e) a second escapement pawl rotatably mounted on said second escapement gear and adapted to be engaged with said ratchet rack, said pawl having a lift spring attached thereto;
 (f) a third escapement gear rotatably mounted to said adjacent ratchet rack, said third escapement gear being engaged with said second escapement gear and being connected to said second escapement pawl lift spring; and
 (g) a flywheel gear rotatably mounted adjacent to said ratchet rack, said flywheel gear being engaged with said third escapement gear.

20. A wheel chair as stated in claim 19 which includes shift means for selectively disengaging said governor means comprising: a band coaxially and rotatably mounted with respect to said ratchet rack between said ratchet rack and said escapement pawls, said band having slots therein adapted to permit selectively said escapement pawls to engage said ratchet rack.

21. An occupant-driven, foldable stair-climbing wheel chair adapted to safely climb stairs and to turn on the stair landings comprising:
 (a) a foldable central chair means for seating an occupant;
 (b) an attitude control means for regulating the angle of said chair means with respect to the surface supporting said wheel chair;
 (c) a drive wheel mounted on each side of said chair means on a drive wheel hub for supporting the rear end of said wheel chair, said drive wheel hub being rotatably mounted on an axle attached to said chair means; and
 (d) retractable stair traction means rotatably mounted on each side of said chair means for engaging the steps of the stairs, said traction means comprising:
  (I) a carrier ring coaxially mounted on each of said drive wheels, each said carrier ring having a radius slightly less than the radius of its associated wheel;
  (II) a plurality of lugs pivotally mounted around the circumference of each of said carrier rings, each of said lugs having an outer end adapted to be selectively extended beyond the circumference of its associated wheel and retracted within the circumference of said associated wheel; and
  (III) a handle ring pivotally connected to the lugs on each of said carrier rings and mounted coaxially with respect to said associated wheel, said handle rings each having a radius less than the radius of said associated wheel and being adapted to move said lugs between their extended and retracted positions.

References Cited by the Examiner
UNITED STATES PATENTS

| | | | |
|---|---|---|---|
| 1,169,239 | 1/1916 | Coder | 188—85 |
| 1,994,065 | 3/1935 | Dean | 301—46 |
| 2,218,838 | 10/1940 | Alspaugh | 74—750 |
| 2,544,050 | 3/1951 | Schnell | 301—47 |
| 2,580,955 | 1/1952 | Przybylski | 74—750 |
| 2,876,868 | 3/1959 | Nerwin | 188—85 |
| 3,104,112 | 9/1963 | Crail | 280—5.2 |
| 3,111,331 | 11/1963 | Locke | 280—5.22 |
| 3,127,188 | 3/1964 | Greub | 280—5.22 |
| 3,142,351 | 7/1964 | Green | 180—8 |

BENJAMIN HERSH, *Primary Examiner.*

LEO FRIAGLIA, A. HARRY LEVY, *Examiners.*